United States Patent
Lahoz et al.

(10) Patent No.: US 9,942,244 B2
(45) Date of Patent: *Apr. 10, 2018

(54) SECURE SERVICE FOR RECEIVING SENSITIVE INFORMATION THROUGH NESTED IFRAMES

(71) Applicant: Excalibur IP, LLC, New York, NY (US)

(72) Inventors: Maria Eugenia Tornos Lahoz, San Jose, CA (US); Anna Chu-Sumida, Cupertino, CA (US); Nikunj Koolar, Milpitas, CA (US); Peter Chan, Foster City, CA (US); Aditi Sinha Gundlapalli, Fremont, CA (US); Surajit Dutta, Fremont, CA (US); Binu Ramakrishnan, Milpitas, CA (US); Venkatesh Dharmar, Sunnyvale, CA (US)

(73) Assignee: Excalibur IP, LLC, New York, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/969,847

(22) Filed: Dec. 15, 2015

(65) Prior Publication Data

US 2016/0277421 A1    Sep. 22, 2016

Related U.S. Application Data

(63) Continuation of application No. 14/794,733, filed on Jul. 8, 2015, now Pat. No. 9,251,372.

(Continued)

(51) Int. Cl.
*H04L 29/06* (2006.01)
*G06Q 20/38* (2012.01)
(Continued)

(52) U.S. Cl.
CPC ........ *H04L 63/126* (2013.01); *G06F 21/6245* (2013.01); *G06F 21/6263* (2013.01);
(Continued)

(58) Field of Classification Search
CPC ....... H04L 63/04; H04L 63/12; H04L 63/126; G06F 21/60; G06F 21/62; G06F 21/6245;
(Continued)

(56) References Cited

U.S. PATENT DOCUMENTS

| 2010/0049792 A1* | 2/2010 | Hao ........................ H04L 63/20 709/203 |
| 2012/0084663 A1* | 4/2012 | Momchilov .......... G06F 3/0481 715/744 |

(Continued)

*Primary Examiner* — Khang Do
(74) *Attorney, Agent, or Firm* — Martine Penilla Group, LLP

(57) ABSTRACT

Methods and systems for receiving sensitive information include receiving a request for entering sensitive information, the request received from a user interface rendered on a client device. The methods and systems rely upon nested iframes, each of which is hosted by a different server. An inner iframe is hosted by a server within a secure zone, such as a digital vault. A middle iframe is hosted within the secure zone and is invoked by an intermediate server. An outer iframe is hosted by a server that provides the user interface. The server that provides the user interface may be hosted by a cloud service provider, for example. Using the nested iframes and the network topology described in the present disclosure, users are able to exchange sensitive information with a server within the secure zone through a user interface provided outside the secure zone.

17 Claims, 12 Drawing Sheets

Related U.S. Application Data

(60) Provisional application No. 62/136,430, filed on Mar. 20, 2015.

(51) Int. Cl.
*G06F 21/62* (2013.01)
*G06Q 30/06* (2012.01)

(52) U.S. Cl.
CPC ....... *G06Q 20/382* (2013.01); *G06Q 20/3821* (2013.01); *G06Q 30/0613* (2013.01); *H04L 63/04* (2013.01); *H04L 63/102* (2013.01)

(58) Field of Classification Search
CPC .. G06C 20/38; G06C 20/382; G06C 20/3821; G06C 30/06; G06C 30/0601
See application file for complete search history.

(56) References Cited

U.S. PATENT DOCUMENTS

| | | | |
|---|---|---|---|
| 2012/0089481 A1* | 4/2012 | Iozzia | G06F 21/31 705/26.41 |
| 2013/0238890 A1* | 9/2013 | Pieper | H04L 63/0428 713/150 |
| 2013/0263263 A1* | 10/2013 | Narkolayev | G06F 21/51 726/22 |
| 2014/0189498 A1* | 7/2014 | Liverant | G06Q 30/0277 715/234 |
| 2014/0280566 A1* | 9/2014 | Chen | H04L 67/306 709/204 |
| 2016/0306527 A1* | 10/2016 | Davidchuk | G06F 9/4443 |

\* cited by examiner

Property Billing Page 102

No action iFrame 3 (Not in secure zone) 110-3

No action iFrame 2 (inside secure zone) 110-2

Billing iFrame 1 (inside secure zone) 110-1

Name

Card #

Address

Figure 3A

Property Billing Page 102

Name — 110-1a (No action iFrame 3 (Not in secure zone) 110-3a / No action iFrame 2 (inside secure zone) 110-2a)

Card # — 110-1b (No action iFrame 3 (Not in secure zone) 110-3b / No action iFrame 2 (inside secure zone) 110-2b)

Address — 110-1c (No action iFrame 3 (Not in secure zone) 110-3c / No action iFrame 2 (inside secure zone) 110-2c)

SECURE SERVICE FOR RECEIVING SENSITIVE INFORMATION THROUGH NESTED IFRAMES

CLAIM OF PRIORITY

This application is a continuation of U.S. patent application Ser. No. 14/794,733, filed on Jul. 8, 2015, titled "SECURE SERVICE FOR RECEIVING SENSITIVE INFORMATION THROUGH NESTED IFRAMES", which claims benefit of and priority, under 35 USC 119(e), to U.S. Provisional Patent Application No. 62/136,430, filed on Mar. 20, 2015, and entitled "Secure Service for Receiving Payment Card Information from a Digital Vault through Nested iFrames." The disclosures of each of these applications from which priority is claimed, are incorporated herein by reference in their entirety for all purposes.

BACKGROUND

Field of the Invention

The present disclosure relates to exchanging sensitive information over a distributed network.

Description of the Related Art

The rise in popularity of the Internet has resulted in an increase in the exchange of sensitive information over distributed networks. Despite issues with security, more and more businesses are opting to conduct business online due to the ease of conducting business by presenting a universal digital presence that can be accessed at any time from any location by any user over the Internet. For example, users prefer to do their shopping online due to the convenience, availability, and ease of use.

When conducting business online, users often need to provide sensitive information. Sensitive information can include debit or credit card account numbers and verification codes, for example, but could also include medical history, test results, or any other information a user might desire to keep private. As more and more business is conducted over the Internet, it is becoming increasingly evident that sensitive information has to be secured to avoid identity theft in order to attract the users and to retain the current user base.

Sensitive financial information represents an important subset of all sensitive information exchanged online. For example, to assist in securing the personal and financial data of users, the Payment Card Industry (PCI) has defined a set of Data Security Standards (DSS) that any business that conducts electronic commerce and collects payment card information need to comply with in order to protect the identity of the consumers and keep the payment card information secure. While protecting payment card information, the PCI DSS, in particular, puts a burden on merchants. For example, merchants collecting the payment card information are subjected to frequent PCI audits to ensure that the payment card collection service engaged by these merchants are DSS compliant and are not exposing the user information to unwanted external elements. Identity theft is becoming a major issue for merchants and users alike.

The majority of businesses conducting business online do not have in-house expertise or resources to satisfy security standards, such as the PCI DSS requirements. Although these businesses acknowledge the ease of use of the web or mobile applications, they do not want to deal with the complexities that arise with accepting and maintaining secure user interfaces and networks. Further, most businesses want to focus on growing by retaining their current customer base and driving towards acquiring new customers. For example, a medical care organization, such as a hospital or managed care organization, may want to be able to communicate with patients through a website without having to maintain its own specialized personnel and infrastructure necessary to maintaining security of patient medical information. A need exists for improved methods and systems for exchanging sensitive information over distributed networks.

SUMMARY

The present disclosure describes methods and systems for receiving sensitive information by introducing a set of intermediary servers between the servers that store sensitive information and a client application that renders web pages or mobile applications to an end user, for example, to initiate the request for sensitive information, such as payment card information or medical history. The various embodiments ensure that the merchants, medical care providers or other entities that collect sensitive information, for example, are able to offer security for the sensitive information without being exposed directly to stringent security requirements, or auditing and scrutiny by industries or councils that set data security standards, much less intruders who would steal the sensitive information.

In the present disclosure, we confine ourselves primarily to describing how a merchant would use the methods and systems of the present disclosure to protect sensitive payment information provided by a customer in compliance with PCI DSS. It will be appreciated, however, that the same methods and systems could be used to protect any kind of sensitive information. Instead of payment information, the methods and systems could be used to protect the medical history or test results of a patient of a medical care provider, for example. There is nothing about the methods and systems described in the present disclosure that is specific to or requires payment information. Nonetheless, and except where otherwise noted, for definiteness and ease of explanation, we will confine ourselves primarily to the example of a merchant hosting a web page for receiving payment information in the remaining disclosure.

Similarly, the user interface provided in the web page hosted by a merchant could be provided in other ways in accordance with the present disclosure. The user interface might be provided by a native mobile application, with data exchanged using dynamic calls to a server through an Application Programming Interface (API) to accept data from and populate the fields of a form in the user interface.

A secure server used to store the sensitive information is typically secured inside a secure zone, such as a digital "vault." In contrast, the user interface for exchanging sensitive information is hosted by a server outside the secure zone (e.g., a server that hosts a website). In one embodiment, an intermediate server is provided and is located on the network between the server outside the secure zone and a server inside the secure zone. In some embodiments, the intermediate server may be either inside or outside the secure zone.

In many embodiments, the secure server, intermediate server, and server providing the user interface that is outside the secure zone may be only one of a large number of servers, accessible together as a system over a distributed network. In some embodiments, the intermediate server may be part of a system that includes computers located entirely within the secure zone, entirely outside the secure zone, or with some computers inside the secure zone and some computers outside the secure zone.

The intermediate server provides a level of indirection and segmentation, thereby sparing merchants from falling into the scope of any industry scrutiny or audits. Further, this level of indirection and segmentation prevents intruders from accessing the secure information (e.g., payment information), thereby sparing merchants from having to frequently monitor the systems that collect the secure information and from having to perform complex maintenance of such systems.

In one embodiment, a user interface is provided by an application, and the user interface includes an inline frame (iframe) that is provided by a service. The user interface is configured to engage the service whenever sensitive information is to be exchanged. The service provides additional iframe architecture, including a complex iframe that includes at least two additional iframes nested inside a first iframe. Using the nested iframes, users can, for example, enter payment card details to complete an online transaction. In some embodiments, the nested iframes may be used to select from existing payment card details that are already available. Selection of existing payment card details, for example, may be performed through API calls wherein the user interface rendered on a web page is used to make an API call to an intermediate server (referred to herein also as a payment user interface (UI) host), which in turn makes API calls to a secure server (referred to herein also as a vault host) within the vault. In some embodiments, each field that receives sensitive information through a user interface has its own set of nested iframes. The nested iframes allow the user interface to exchange sensitive information securely while meeting only the minimum compliance requirements that may be necessary and specified for accepting sensitive information.

In one embodiment, a method for receiving sensitive information, through a user interface is disclosed. The user interface may be displayed on a web page or a native mobile application. The method includes providing a first inline frame (iframe) for generating at least one field of a form that is used to receive the sensitive information. The first iframe is hosted by a first server that is within a secure zone. Note that a server that has been assigned a network address is often referred to as a "host," and the terms "host" and "server" tend to be used interchangeably. A secure zone, otherwise termed a "digital vault" or simply "vault" in the present disclosure, is defined as a zone that segregates the one or more servers that are hosted within from other network or public devices so that selective access or no access is allowed from other network or devices to the servers hosted within the secure zone. Access is generally controlled using one or more firewalls, although other security devices may be used in addition. The one or more firewalls may be specified in accordance with security policies, which specify very strict and tightly controlled authentication and authorization process for accessing the servers within the secure zone.

A second iframe is provided to access the first iframe. The second iframe is hosted within the secure zone and is invoked by a second server. The second server is also within the secure zone (although, as noted above, in some embodiments the second server may be part of a system in which some or all servers are located outside the secure zone). The second server invoking the second iframe is different from the first server hosting the first iframe.

A third iframe is embedded within a user interface. The third iframe is used to invoke the second iframe using a sensitive information token. The third iframe is invoked by a third server that is outside the secure zone in response to a request received at a user interface. In some embodiments, the third server hosts HTML (including the third iframe) for a web browser on a client device (such as laptop, desktop, smartphone, or tablet). In other embodiments, the third server hosts the user interface for access by a native mobile application, which in turn displays the iframe on a client device (such as an iPhone or Android device). The second iframe is nested inside the third iframe. A request to enter the sensitive information is received from the user interface that includes the at least one field. In response to receiving the request, the second iframe is invoked through the third iframe and the first iframe is invoked through the second iframe for receiving sensitive information. In many embodiments, the second and the third iframes are hidden from view while the first iframe includes viewable attributes that allow a user interface form with the at least one field to be rendered on a web page for receiving the sensitive information.

In one embodiment, a method is disclosed. The method includes receiving a request to enter sensitive information. The request is received from a webpage rendered on a client device. The request includes a first access token. A user interface (UI) host is invoked to validate the first access token provided in the request. The UI host is invoked using an inline frame (iframe). The first access token provided in the request is validated using the UI host. The UI host, upon validating the request, retrieves a second access token for accessing a secure zone. A vault host within the secure zone is invoked by the UI host using the second access token. The vault host is used to validate the second access token. A response is received from the vault host that is in the secure zone. The response includes a command to allow access to a one or more fields on the webpage for entering the sensitive information. The response is forwarded to the client device for processing so as to allow access to the one or more fields on the webpage. The UI form is used to receive the sensitive information.

In another embodiment, a non-transitory computer-readable medium having program instructions for executing a service for receiving sensitive information, is disclosed. A user interface is configured for using the service. The computer-readable medium includes program instructions for receiving a request from the user interface hosted by a server outside a secure zone. The request is received by a server within the secure zone through a third, second and first iframes. The computer-readable medium further includes program instructions for invoking a second iframe upon successful validation of an access token received with the request. The computer-readable medium further includes program instructions for invoking the first iframe upon successful validation of a secure access token received via the second iframe. The third iframe is hosted by the server outside the secure zone, and the first and second iframes are hosted by the server within the secure zone. The first iframe is nested within the second iframe and the second iframe is nested within the third iframe. The computer-readable medium further includes program instructions to hide the second and the third iframes from view in the user interface.

The embodiments of the invention thus provide a simple but an intelligent way of protecting sensitive information from intruders while sparing merchants (or other service providers) from the complexities of maintaining a system for accepting sensitive information from users. The burden of providing access to a form with fields on a user interface that is used for collecting the sensitive information, such as payment card information, is centrally designated to a set of intermediate servers. The servers inside the secure zone implement the necessary security and segmentation controls so that the sensitive information within the secure zone cannot be accessed by anyone other than authorized intermediate servers. In other words, access to the sensitive information within a digital vault is tightly maintained by implementing high standards of security and encryption to keep the users' sensitive information safe.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 3A illustrates an example user interface showing a form within a nested iframe in accordance with an embodiment of the invention.

FIG. 3B illustrates an alternative example user interface showing fields of a form that include a nested iframe in accordance with an embodiment of the invention.

FIG. 6 illustrates an example of a property billing page of a merchant in which a nested iframe is implemented to collect payment card information in one embodiment of the invention.

DETAILED DESCRIPTION

Figure 1:
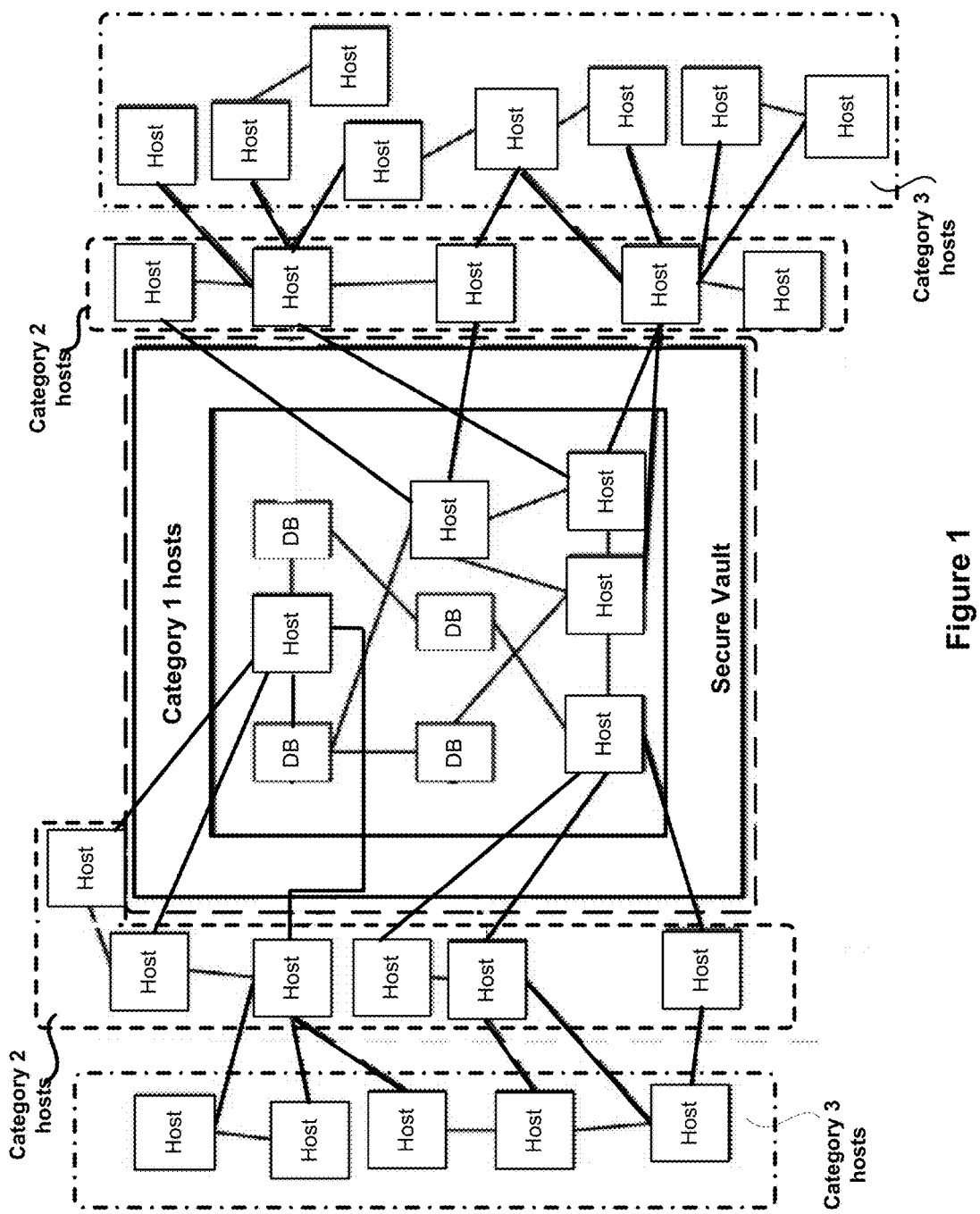
FIG. 1 illustrates a simplified overview of a system that identifies the different categories of servers in accordance with some embodiments of the invention.

The present disclosure describes methods and systems for protecting sensitive information, such as payment card or other financial, medical, or personal information. The embodiments allow any organization hosting a web page or mobile application user interface capable of exchanging sensitive information to protect that information by implementing nested iframes through a specified network architecture. The nested iframes and network architecture avoid exposing the user interface to outside elements, thereby securing the sensitive information. In several embodiments, the nested iframes would comply with the standards set by various councils, including the PCI DSS.

Some of the requirements to isolate and secure the user interface that collects sensitive information require a certain level of security and segmentation controls to be implemented at the different servers that interact with or renders a user interface. For example, the servers outside of a secure zone that serve the user interface should not provide security functionality, such as authorization, authentication, or access control to another device within the secure zone that collects sensitive information either directly or indirectly. Some examples of the sensitive information that may be collected and secured within the secure zone and need restricted access may include social security information, medical history data, password, security codes, birth dates, other personal birth record information, key codes, encryption codes, pass codes, mother's maiden name, bank account numbers, phone numbers, employment data, driver's license data, passport number and other passport related data, emails, etc. Of course, the aforementioned list provides some examples and the sensitive information that can be collected may include other sensitive data that needs to be secured within a secure zone. These outside hosts, therefore, cannot initiate a connection to a device within the secure zone, even through an intervening host. Conversely, the hosts from within the secure zone cannot initiate a connection to the outside hosts. These outside hosts are not permitted to process, store or transmit sensitive data. All direct connections between the host serving the user interface and the hosts within the secure zone are actively blocked. These strict requirements are in some cases necessary to comply with security standards. The present disclosure describes methods and systems for nesting iframes, which are capable of complying with strict security requirements, including the PCI DSS.

For clarity and definiteness, the remainder of the present disclosure describes the invention in terms of a web page or native mobile application user interface (which may be generically referred to as a "user interface" of a "merchant property page"). But the same invention may be used by any host of a user interface, and not only a merchant. For example, the same invention may be used by a medical care organization that accepts sensitive medical information. Moreover, the merchant property page may be displayed in a variety of ways. In some embodiments, the property page may be displayed in a web browser on laptop, desktop, or mobile device. In other embodiments, the property page may be displayed or embedded in an application native to a mobile device.

The nested iframe architecture, wherein each of the two inner iframes is served and rendered by a different host and the merchant property page is served and rendered by still another host different from those serving the two inner-most iframes, allows a level of indirection and segmentation unknown in the prior art. This level of indirection and segmentation allows collection of sensitive information without compromising on the safety and security of the users.

The nested iframe comprises at least three levels. The first level (or "inner") iframe is hosted by a server or servers within the secure zone (typically, a vaulted data center or vaulted portion of a data center). The second ("intermediate"

or "middle") level iframe is invoked by a second server that is outside the secure zone or by servers some of which are within the secure zone while others are outside the secure zone, and provides a nest for the inner iframe. The second iframe is hosted within the secure zone. In some embodiments, the second iframe is hosted by a server or servers within the secure zone that are different from the server or servers that host the first level iframe. Note that in the embodiments wherein the second level iframe may be hosted by at least one server within the secure zone, the server may not be within the same secure zone as the servers hosting the first level iframe. Depending on the embodiment, the second level iframe may be (a) hosted by servers with an intermediate level of security between a first level of security associated with the server(s) hosting the first level iframe and a third level of security (described below), (b) hosted by servers within the same secure zone as the servers hosting the inner iframe, or (c) hosted by servers within the same logical zone as the third level (described below).

The third level includes a third server or servers that host a third iframe, in which is nested the second iframe. The third server is outside the secure zone. The second and the third iframes are empty iframes, hidden from view in the user interface, and the first iframe is included in the user interface that provides the fields for receiving sensitive information. Note that the first iframe is not shown in the sense that it is not displayed to the user although it is still present in the HTML served by the host of the user interface. In an alternative embodiment, the user interface may be provided by a native mobile application, which makes API calls through an iframe. In such an embodiment, the iframe is also not displayed to the user although it would still be present and detectable in the requests exchanged with the host of the user interface.

In an embodiment, the first iframe is rendered on the property page. In this embodiment, the third and the second iframes include rendering attributes that are configured to keep the third and the second iframes hidden from view on the property page while the first iframe includes rendering attributes (for example, in the form of fields for obtaining the payment card information) that are configured to render the fields of a user interface form on the user interface on the property page. In other words, based on the configuration of the rendering attributes at the different iframes, the second and the third iframes are effectively hidden from view on the property page while the first iframe is visible on the property page. The nested iframe can be rendered inline on the property page or can be displayed in a separate popup browser window. Using the nested iframe architecture, users can enter new payment method details or select from previously defined methods and such method details are shielded in accordance to the standards and requirements established by various agencies, councils, or industry standards-setting organizations.

The nested iframe described in the present disclosure allows an HTML element from a vault source (i.e., the inner iframe hosted by a server within the secure zone) to be embedded within an HTML element hosted by an intermediate server (i.e., the middle iframe), which in turn is embedded within the HTML element of a property page where submission of sensitive information is initiated.

Importantly, the inner iframe is segregated and protected from the property page by the middle iframe, allowing indirection and segmentation. For example, when a cardholder selects to enter the payment card and other private information using the iframe on the property page, the cardholder data entered on the property page is being channeled to the servers in the vaulted secure zone. The servers within the secure zone retrieve the sensitive information entered through fields of a form presented on the user interface, validate the same, encrypt and store the encrypted sensitive information within a storage device (such as a database) inside the secure zone. Thus, even though it would appear that the user is entering sensitive information on the property page, the nested iframe ensures that the sensitive information is actually entered in one or more fields of the UI form provided by the inner iframe and the sensitive information data is exchanged only with servers within the secure zone. The nested iframes, in effect, form a conduit for communication directly between the end user and the servers within the secure zone.

As mentioned earlier, the nested iframe includes an outer iframe, a middle iframe and an inner iframe. The outer iframe is allowed only to invoke the middle iframe and the middle iframe is allowed to invoke the inner iframe. Thus, the outer iframe on the property page creates a conduit through the middle iframe, permitting exchange of sensitive information with servers in the secure zone. Sufficient checks are provided at the servers inside the secure zone to ensure that access to the secure zone is available only through authorized intermediate servers. With the brief overview of the invention, specific embodiments will be discussed with reference to the various drawings.

FIG. 1 illustrates an overall classification of systems used in protecting payment card information of users collected by merchants during online transaction. The overall classification of systems may be, in one embodiment, in accordance to standards and requirements set by the PCI or other council that overlooks the protection of the users' payment and other personal or financial information. In accordance with the classification, the servers that are used in a transaction can be broadly classified into 3 different categories: category 1, category 2 and category 3. The servers that directly collect payment card information are classified as category 1 servers. These category 1 servers have the highest level of exposure with the data collection and storage. To prevent exposure of the payment card related information, all category 1 servers are required to adhere to strict security compliance so that the personal and financial data of users can be shielded from unwanted external elements. As a result, the category 1 servers, in some embodiments, are maintained inside a secure zone, such as a digital "vault", so as to protect and segregate these servers from other systems in the network. Servers that connect to the category 1 servers inside the secure zone either directly or indirectly are classified as category 2 servers.

Category 2 servers are outside the vault and connect to the category 1 servers within the vault either directly or indirectly. In some embodiments, category 2 servers may connect to category 1 servers indirectly through other category 2 servers. These servers do not have the stringent requirements of category 1 servers as they do not collect or maintain the personal and payment card data. There should, however, be a significant level of security implemented within these servers as they are interfacing with category 1 servers. Servers that connect to the category 2 servers and have sufficient segmentation in place are classified as category 3 servers. The category 3 servers need to implement some level of security and segmentation controls to allow them to not directly or indirectly impact or compromise the payment card information collected by the category 1 servers within the secure zone. In order to avoid exposing the users' payment card or other sensitive information, security controls may be put in place to prevent the category 3 servers to directly or indirectly connect to the category 1 servers but instead go through the intermediate category 2 servers. In some embodiments, the servers providing the property pages used for transactions are classified as category 3 servers. Using this broad classification of the systems, various embodiments will be described with reference to the remaining drawings. Furthermore, it should be understood that a server may function as a host, wherein a host is configured to service applications. The applications can be, for example, client applications that are accessed by client devices. The client applications, in some embodiments, can define a website or parts of a website.

Figure 2A:
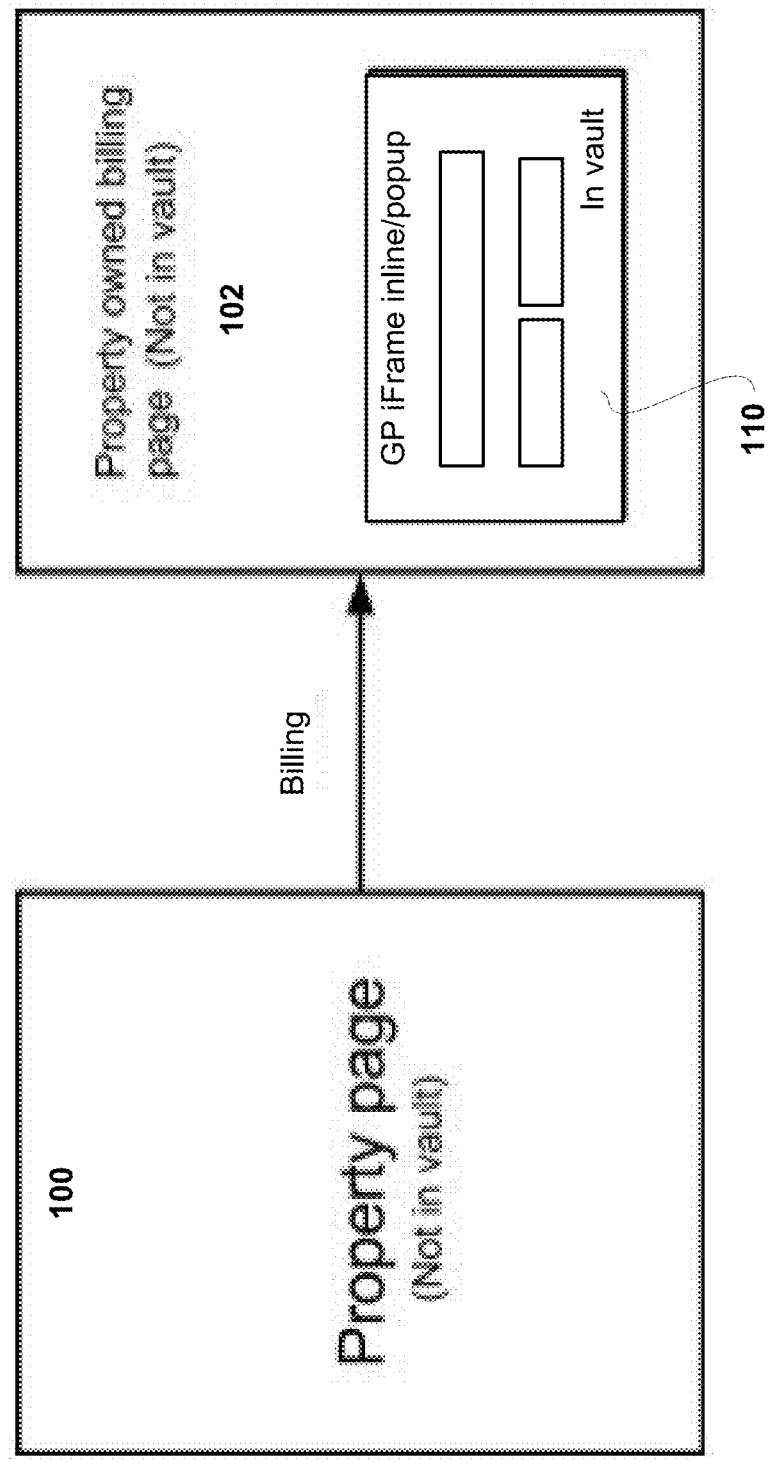
FIG. 2A illustrates an example billing page used by an online merchant in accordance with an embodiment of the invention.

FIG. 2A illustrates an example of a merchant billing page 102 that is invoked from a property page 100 rendered on a client device when a user needs to enter payment card information while conducting a transaction using the client device. The property page 100 and the merchant billings page 102 are provided by a host system (e.g., a server) for rendering on the client device. The client device may include a computing device capable of sending or receiving signals through a communication network, such as via wired or a wireless network. The client device may, for example, be a desktop computer or a portable device, such as a cellular telephone, a smart phone, a Personal Digital Assistant (PDA), a handheld computer, a tablet computer, a laptop computer, a wearable computer, etc. The aforementioned list of client devices is offered as an example and should not be considered limiting. The client device may include or may execute a variety of operating systems, including a personal computer operating system, a mobile operating system, or the like. The client device may include or may execute a variety of applications, such as the application that is used to invoke the billing page 102.

The billing page 102 includes a user interface 110 for collecting the payment card information, in one embodiment. The user interface 110 is provided with an iframe. In the embodiment illustrated in FIG. 2A, the iframe is a nested iframe and the user interface (UI) is provided as an inline UI. In some embodiments, the iframe may provide a popup UI that is rendered in a separate window on a display of a client device that is used to access the property page 100 and the billing page 102 for conducting the transaction. In still other embodiments, the UI may be provided in a mobile application on a mobile device, either through a web page displayed on a browser or through a native application. In the case of the native application, sensitive information displayed and received through a form in the UI may be exchanged through API calls made in HTML format, including nested iframes. The billing page 102 is an extension of the merchant's property page 100 and is therefore provided by a host system (or simply a host) outside the secure zone. However, the iframe that provides the user interface 110 on the billing page 102 provides a secure access channel to the secure zone to allow the user to either enter payment method details or select from previously entered payment method details.

The host system, in one embodiment, is a server computing device that is capable of sending or receiving signals, such as through the wired or wireless network, and/or may be capable of processing or storing signals. Servers may vary in configuration and/or capabilities, but most servers include one or more processors (central processing units) and memory. The server may also include one or more mass storage devices, one or more power supplies, one or more wired or wireless network interfaces, one or more input/output interfaces, or one or more operating systems (OS), such as Windows® Server, Mac® OS X, Unix®, Linux®, FreeBSD®, or the like.

Verification of sensitive information, such as payment method details, is provided by servers in the secure zone. Success and failure responses from the servers in the secure zone are returned to the user interface on the property page 102 via callbacks, in one embodiment. The success and failure responses may be generated during validation of the access at various levels of the nested iframe, as will be explained in detail with reference to FIG. 4. Upon validation, the payment card information provided in the UI form within the user interface is retrieved by the servers that are within the secure zone, encrypted and stored in a database within the secure zone. It should be noted that each property page of a merchant that is engaged in conducting a transaction and collecting payment card information includes the nested iframe in order to provide security during collection of the payment card information. The plurality of iframes within the nested iframe provide sufficient segmentation to allow the merchant property pages to be qualified as PCI DSS category 3 property pages and to ensure that the merchant property pages have the least amount of exposure to users' payment and other personal, financial and security-related data involved in the transaction.

Figure 2B:
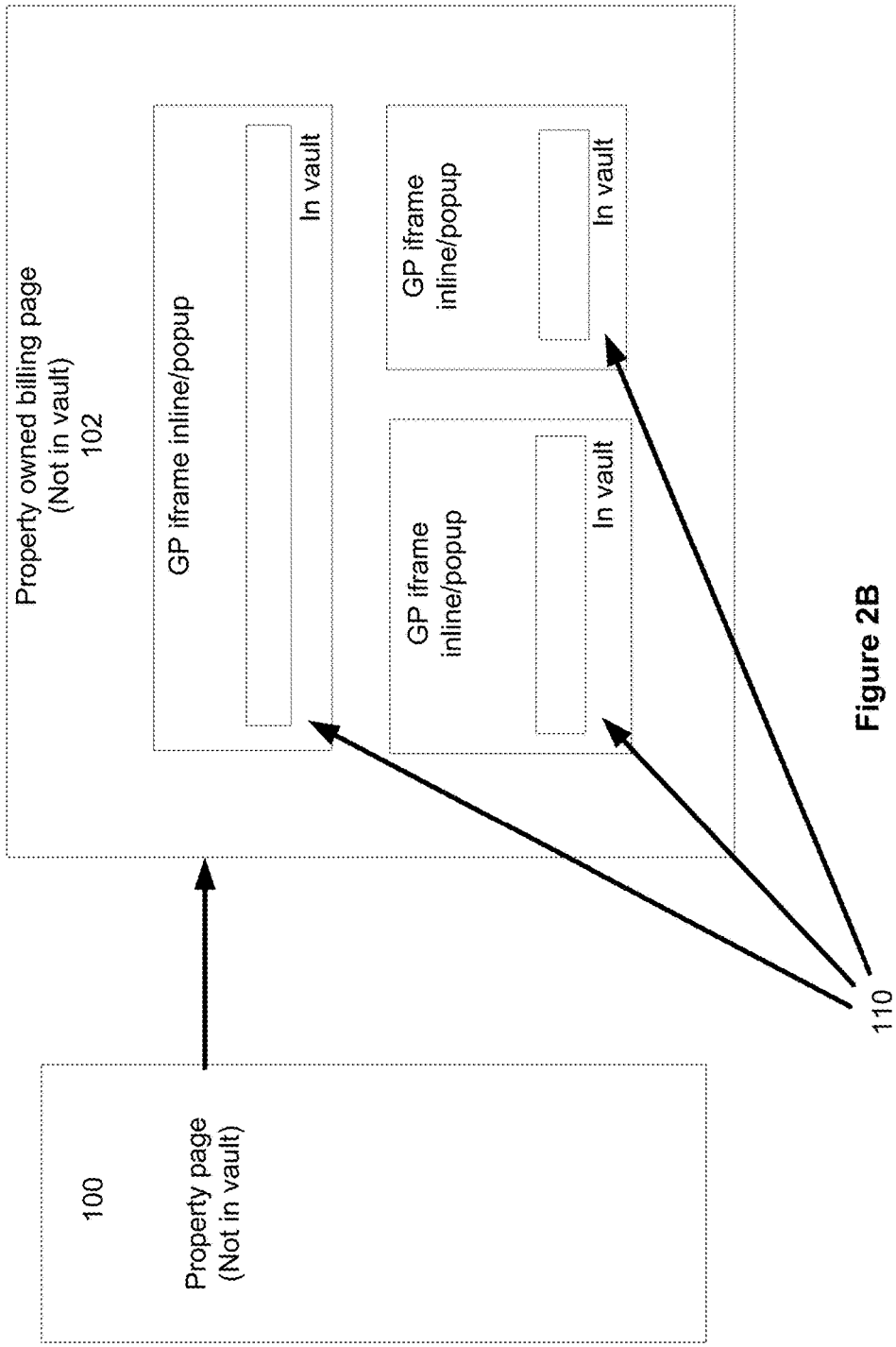
FIG. 2B illustrates an alternate embodiment of a billing page illustrated in FIG. 2A for collecting individual field of sensitive information, in accordance with an embodiment.

FIG. 2B illustrates an alternate embodiment of a merchant billing page illustrated in FIG. 2A, in that each field rendered in the user interface (UI) 110 used for exchanging sensitive information is associated with corresponding nested iframes. In one embodiment, the nested iframes for each field is hosted and used in the same way as the nested iframe for the UI shown in FIG. 2A.

FIGS. 3A and 3B illustrate nested iframes provided on a user interface in accordance with various embodiments of the invention. In both FIGS. 3A and 3B, nested iframes comprise a combination of at least three iframes. Referring first to FIG. 3A, the iframe 110-1 (otherwise referred as iframe-1 or inner iframe) that provides the user interface form with one or more data fields to collect sensitive information is hosted by a server inside the secure zone. The server hosting the iframe-1 within the secure zone receives sensitive data and makes application programming interface (API) calls to verify the data and to persist the data in storage. The server hosting the iframe-1 is referred to herein as a vault host. In some embodiments, the API calls are JavaScript Object Notation (JSON) based calls. In some embodiments, the servers hosting the iframe-1 are PCI DSS category 1 servers. In such embodiments, the category 1 servers are not virtualized servers. In various embodiments, these servers may nonetheless be part of a cloud network, part of a wide area network, or a local area network.

The second iframe 110-2 (otherwise referred as iframe-2 or middle iframe) is used to invoke iframe-1 and is also provided within the secure zone. In some embodiments, iframe-2 is hosted by one or more category 1 servers. The iframe-2 is an empty iframe. The third iframe 110-3 (also referred as iframe-3 or outer iframe) is used to invoke iframe-2. The iframe-3 is located outside the secure zone and is embedded on and accessed from the property page, such as a merchant's billing page. The iframe-3 is also an empty iframe and is used only to invoke the iframe-2 that is hosted within the secure zone. In some embodiments, the iframe-3 is hosted by a category 2 server. In such embodiments, the category 2 server may be one or more of virtual servers or non-virtual servers. The server hosting the iframe-3 is used to validate the user and trust cookies provided in the request from a user and to pass form request information to the iframe hosts inside the secure zone. The iframe-1 is visible on the property page and iframe-2 and iframe-3 are hidden from view at the property page. Even though iframe-3 is hidden, iframe-3 provides the conduit to iframe-1 through the hidden iframe-2 to allow the iframe-1 to collect the sensitive information. In other words, iframe-1 provides the user interface (UI) form for receiving the sensitive information. As such the sensitive information (such as payment card data) entered in the UI form at the property page is collected, validated, encrypted and stored by the hosts hosting the iframe-1 from within the secure zone.

Referring to FIG. 3B, an alternative embodiment of the user interface hosted by a server is shown. In the alternative embodiment of FIG. 3B, nested iframes (for example, 110-1*a* through 110-3*a*, 110-1*b* through 110-3*b*, 110-1*c* through 110-3*c*, etc.) are provided for each field of a form in a user interface provided on a property page. In accordance with this alternative embodiment, API calls are made to populate each field and submit each field, in accordance with known asynchronous JavaScript and XHTML (AJAX) program patterns. In an embodiment, the API calls may be executed in accordance with a framework, such as jQuery™, Angular™, Ember™, or YUI™. The nested iframes shown in FIG. 3B are hosted and used in the same way as the nested iframe shown in FIG. 3A, the difference being simply that only a single field of data is exchanged in accordance with the embodiment shown in FIG. 3B whereas an entire form of data is exchanged in accordance with the embodiment shown in FIG. 3A.

As noted above, the nested iframe for each field includes an iframe-1 (110-1*a*, 110-1*b*, 110-1*c*, etc.,) hosted inside a secure zone to exchange sensitive information data, an iframe-2 (110-2*a*, 110-2*b*, 110-2*c*, etc.,) also hosted within the secure zone and invoked using an intermediate server, and an iframe-3 (e.g., 110-3*a*, 110-3*b*, 110-3*c*, etc.,) hosted by a server outside the secure zone. The iframe-2 and iframe-3 are empty frames that are used to only provide a sense of indirection and are not configured to collect any data. Whereas, the iframe-1 includes fields that are activated by a command passed by the iframe-1. The fields are configured to exchange sensitive information in individual field form. In one embodiment, the field input data exchanged between the user interface (e.g., merchant's billing page) and the server within the secure zone is not done through HTML form user interface but through hypertext transfer protocol (HTTP) post request. As a result, the field inputs that include sensitive information are collected from nested per-field iframes by iframe-1 (i.e., inner iframe) Javascript™ using iframe-to-iframe communication and transmitted in the HTTP post request. Such data exchange provides sufficient segmentation and indirection while providing a secure transmission of sensitive data with minimal exposure of user's sensitive data to external elements.

Data flowing between the iframes within the nested iframe architecture can be tightly controlled to follow secure communication protocols. For instance, requisite headers and sufficient security checks and balances may be implemented to ensure that the data exchanged between these iframes is not visible to the users and is not easily decipherable by outside unwanted elements.

Figure 4:
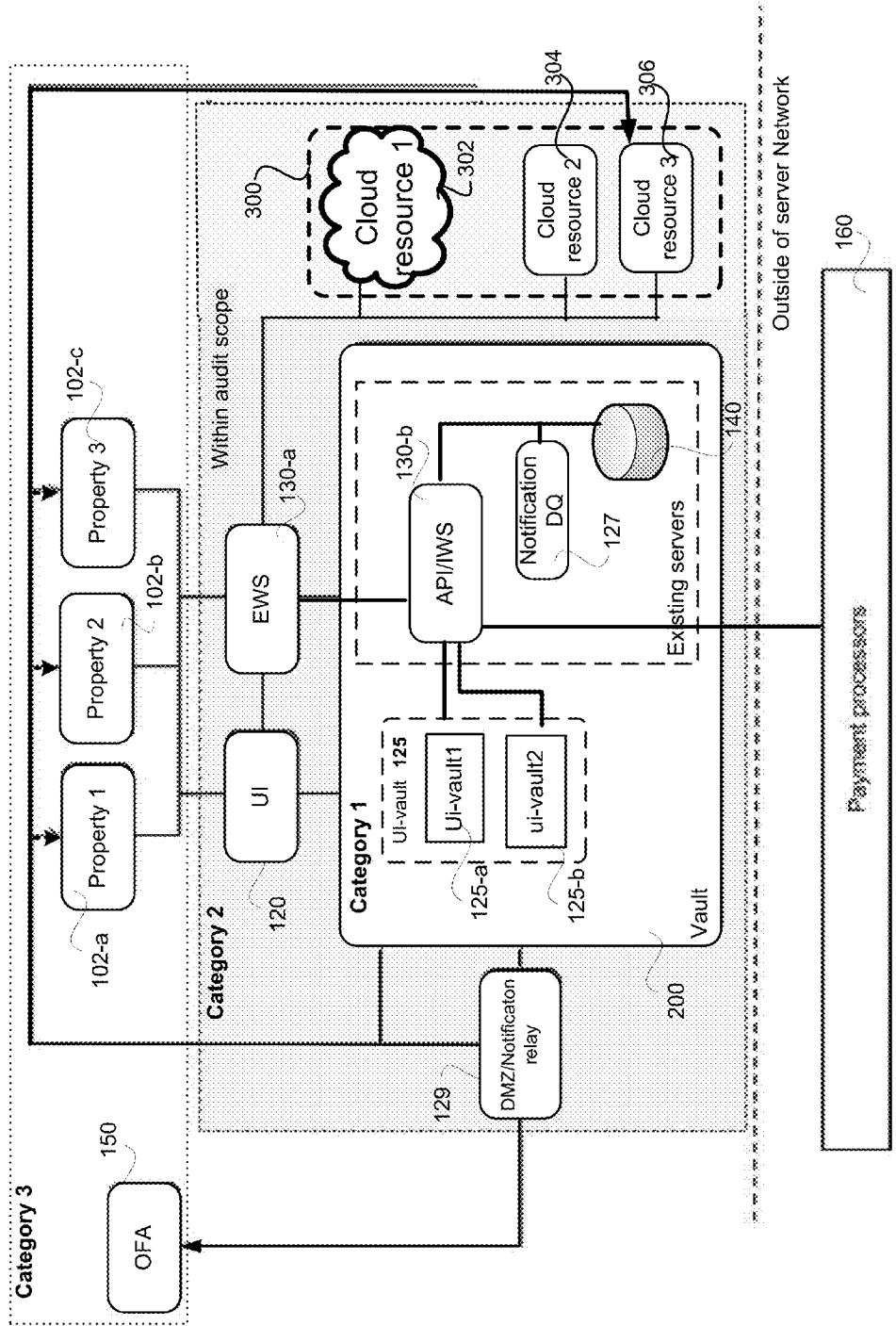
FIG. 4 illustrates an example architecture for a payment platform used to provide payment card and other personal information of a user in accordance with an embodiment of the invention.

FIG. 4 illustrates an example system architecture that is used for exchanging sensitive information securely using a user interface with an embedded nested iframe, in one embodiment. In the example shown in FIG. 4, the user interface allows a user to make a payment on a merchant's billing page. In accordance with this example, when a payment has to be made on a property page, such as the merchant's billing page 102-*a*, 102-*b*, 102-*c*, a request is initiated that invokes the outer iframe of the nested iframe architecture that is embedded in the property page. The server hosting the merchant's billing page performs preliminary verification of the user data provided in the request, such as user access data, user identity, preliminary cookie verification, etc., at the merchant's page, which (in PCI DSS terms) is a category 3 page. Upon successful verification, the server hosting the merchant's billing page, in one embodiment, generates a first access token, uses the outer iframe to invoke a host, such as a payment UI host, and passes the generated first access token along with the request that includes the user related information to the payment UI host. In other embodiments, the server hosting the merchant's billing page retrieves the first access token associated with the payment UI host and passes the retrieved first access token along with the request to the payment UI host through the outer iframe. If the request is to add a new payment method, such as adding a new credit card information, a new debit card information, etc., then a UI module 120 is invoked for processing the payment method. If, on the other hand, an existing payment method is to be selected, then an external web service (EWS) module 130-*a* is invoked. The first access token (also referred to herein as sensitive information token) and the request will include the necessary information and the proper triggers to identify the correct Payment UI host and invoke the appropriate module within the identified Payment UI host. The Payment UI host, in this embodiment, acts as an intermediate server.

In one embodiment, the information provided in the request may indicate that the user is interested in adding a new payment method. In this embodiment, the payment UI host invokes the UI module 120 by passing the request information along with the first access token through the third iframe that is outside the secure zone. The Payment UI host that is outside a secure zone (i.e., a digital vault) receives the request information. The payment UI host may be one or more virtual or non-virtual servers. In some embodiments, these virtual or non-virtual servers may be part of a cloud network or may be part of wide area network (WAN) or a local area network (LAN). The invoked UI module 120 then performs a sequence of validation beginning with the first access token validation and performs other validation, such as user cookie, trust cookie, secure socket layer cookie validation, secure cookie crumb (Scrumb) validation, crumb validation, etc., to ensure that the information provided in the request and the first access token is from a valid client device and may, in some embodiments, perform additional validation to see if the request is from a user that has been engaged with the merchant page at the client device for at least a pre-defined period of time. The aforementioned validation is illustrated as an example and fewer or additional data may be validated including other proprietary or non-proprietary data provided in the request.

Upon successful validation, the UI module 120 invoked by the payment UI host identifies and retrieves a second access token (i.e., vault access token or secure zone access token) and passes the second access token along with the other data from the request to a UI-vault module 125 within the secure zone through a second iframe. In accordance with PCI DSS standards, the payment UI host may be a category 2 host and the second iframe within the secure zone (i.e., digital vault) is invoked by the payment UI host.

In one embodiment, the UI-vault module 125 of a vault host executing in the secure zone receives the second access token (otherwise referred to as vault access token) and other data (such as a second set of cookies) provided in the request through the second iframe, validates the second access token and performs additional validation of the other data (such as the second set of cookies). In some embodiments, the second set of cookies is the same as the set of cookies and token information passed through the outer iframe. In some embodiments, the UI-vault module 125 may be a composite UI-vault module made up of more than one UI-vault module, with each UI-vault module being hosted by a separate vault host within the secure zone. In some embodiments, each UI-vault module within the composite UI-vault module may be used to perform validation of specific ones of the data provided within the request. In some other embodiments, a first UI-vault module within the composite UI-vault module may be used to provide a level of indirection or segmentation within the secure zone while the second UI-vault within the composite UI-vault module may be used to perform the validation of the data provided in the request.

In some embodiments, the UI-vault module 125 receives the first access token in addition to the second access token and other data provided in the request. In these embodiments, the UI-vault module 125 may first perform the validation of the first access token before validating the second access token and other data. In some embodiments, the UI-vault module 125 may include two sub-modules UI-vault1 sub-module 125-*a*, and UI-vault2 sub-module 125-*b*, with each sub-module performing validation of specific ones of the data provided using the second iframe. For example, the UI-vault1 sub-module 125-*a* may perform the validation of the second access token and other data provided in the request while UI-vault2 sub-module 125-*b* may perform the validation of the first access token provided in the request. In an alternate example, UI-vault1 sub-module 125-*a* may perform the validation of the first access token and other data while the UI-vault2 sub-module 125-*b* may be used to validate the second access token. In these embodiments, the first access token is verified twice—the first time by the payment UI host, a category 2 host that is outside the secure zone, and the second time by the vault host, a category 1 host that is inside the secure zone.

In accordance with the embodiments wherein UI-vault module 125 is provided within the vault host, the UI-vault module 125 may first validate the second access token to ensure that the token is from an authorized Payment UI host that is allowed to communicate with the vault host. As the UI-vault module 125 is within the secure zone 200 (i.e., digital vault or simply, 'the vault'), access to the UI-vault module 125 is tightly controlled. As a result, any communication the vault host receives has to be verified to ensure it receives tokens and requests only from trusted sources. In some embodiments, the UI-vault module 125 may verify the second access token against a host database to ensure that the payment UI host that sends the second access token is a valid and trusted source. Upon validating the payment UI host, the UI-vault module 125 may perform the validation of the other data provided in the request in a way similar to how the UI module 120 within the payment UI host performed the validation. The aforementioned steps of validating the data provided in the request may be extended to the embodiments where a composite UI-vault module or two UI-vault sub-modules (UI-vault1 sub-module 125-*a*, UI-vault2 sub-module 125-*b*) are provided within the UI-vault module 125 with each sub-module performing validation of the specific ones of the data provided in the request, as explained above.

To verify the source and the user or host-related information provided in the request, the vault host executing the UI-vault module 125 may engage the service of the application programming interface/internal web service (API/IWS) module 130-*b* to ensure that the second access token is from a trusted source. In embodiments in which the user interface is provided by a native mobile application, all data received from the user may be received through an API/IWS 130-*b*. The API/IWS 130-*b* may, in turn, receive the necessary cookie and other user-related and host-related information from an external web service (EWS) module 130-*a* and perform the validation of the second access token and the other data (including, in some cases, the payment access data, if provided) within the secure zone.

The EWS module 130-*a* may, in one embodiment, access cloud resource services 300 to retrieve the validation information from a set of cloud resources 302, 304, 306, etc. Each of these cloud resources may provide certain type of data for validation. For example, cloud resource 1 may provide user-access and trust cookie data to verify the user-access and trust cookies provided in the request, cloud resource 2 may provide data to validate the hypertext transfer protocol (HTTP) request to ensure that the HTTP request provided within the first access token is not a random HTTP request, and so on. In some embodiments, the EWS module 130-*a* is configured only to perform retrieval of related data from cloud resources and to transmit the retrieved data to the API/IWS module 130-*b* for validating the other data provided in the request. In such embodiments, the cloud resource services 300 may be part of the category 2 system instead of the category 1 system, as depicted in FIG. 4. In other embodiments, the EWS module 130-*a* may assist in the validation of some of the other data provided in the request.

In some embodiments, the UI-vault 125 may provide restrictions of which payment UI host can access the secure zone and such restrictions may be specified using an X-Frame option. For example, the X-Frame option can be used to define HTTP response header to indicate which payment UI host can be allowed to access the UI-vault. The X-Frame option provides additional check to ensure that the iframe from a non-authorized payment UI host is not trying to access the data in the secure zone.

In some embodiments, the verification operation is a two-way operation, in that the UI-module within the payment UI host verifies to ensure that the first iframe that the second iframe is trying to invoke within the secure zone is from the correct vault host, while the UI-vault module 125 of the vault host that is hosting the first iframe (i.e., inner iframe) within the secure zone, verifies to ensure that the second access token data provided through the second iframe is from a trusted and authorized payment UI host. This two-way verification provides a neat check and balance to ensure that the payment UI host providing the second access token through the second iframe is not compromised.

In one embodiment, the information provided in the request may indicate that the user is interested in selecting an existing payment method. In this embodiment, the payment UI host invokes the EWS module 130-*a*. The EWS module 130-*a* interacts with the API/IWS 130-*b* to provide the necessary data obtained from one or more cloud resource services 300 so that the API/IWS 130-*b* can validate the token and other data information provided in the request. As mentioned earlier, the EWS module 130-*a* does not do any validation but only provides the necessary data for validation to the API/IWS module 130-*b*, which performs all the data validation provided in the request. The API/IWS module 130-*b* performs the validation within the secure zone.

In some embodiments, the request may be directed to accessing an existing payment method that identifies a payment card to charge for the e-commerce transaction, to change an address, to update payment card information based on re-issue of a card, or to change, add or delete other data related to an existing payment card. In such embodiments, the EWS module 130-a, interacts with the one or more cloud resources to obtain card data information and interacts with the API/IWS module 130-b to provide the card data information so that a list of card data may be presented to choose from, upon successful validation of the data provided in the request. The list, in one embodiment, may provide card-related data in the form of encrypted handles. The actual card data, in this embodiment, is kept hidden to protect the privacy of user payment information. In some embodiments, the EWS module 130-a is configured to handle every transactional request other than adding a new payment card data, which is handled through the UI-vault module within the secure zone. In some embodiments, the EWS module may be accessed through an API to safeguard the payment data of users. Irrespective of nature of accessing a particular payment method, the vault host executing the UI-vault 125 goes through the validation process indicated herein to ensure that the request is from a valid property page (category 3 server), is from a user that was engaged in the property page for at least a pre-defined period of time, and is received through an authorized payment UI host (category 2 server).

Upon successful verification of the first access token, second access token and other data provided in the request, the payment card information may be encrypted and persisted in data storage 140, such as a card database, that is maintained in the secure zone. Additionally, a notification may be sent back to the merchant property page to indicate that the appropriate payment amount indicated in the e-commerce transaction has been charged to a client account and deposited to the merchant's account. In one embodiment, a notification DQ module 127 may be engaged to generate a notification message to indicate the charge details. Any message, notification, or data provided by the vault host in the secure zone cannot be directly transmitted to the appropriate merchant's property page (102-a, 102-b, 102-c, etc.) as the notification path taken by the direct messages, notifications, or data may expose the one or more servers of the secure vault host to attacks from unwanted external elements. To prevent such exposure, the notification to the property page may be passed through a notification relay module 129. The notification relay module 129 is outside the secure zone but includes sufficient checks and balances in place to ensure that the access to the vault hosts are not compromised or exposed.

In some embodiments, in addition to providing the notification to the respective property pages, the information provided in the notification message may also be provided to a financial accounting service, such as an accounting module or service (OFA) 150, to allow recording the revenues generated by the various e-commerce transactions at the merchant's various property pages. The financial accounting module or service may be part of the merchant's infrastructure or could be part of the hosts' infrastructure. For embodiments that are used to validate sensitive data, such as sensitive medical information, sensitive personal information, etc., similar recording service may be engaged to generate a log of the sensitive information exchanged in the request. In some embodiments, the information provided in the notification message may also be used to update some user-related, session-related, and/or host-related attributes maintained in the one or more cloud resource services 300 so that when subsequent request is received from the web page, current data is provided by the one or more cloud resource services (302-306) to validate or verify the data in the request. For example, when a user accesses the property page using a new client device, the cookies provided to and/or by the new client device may be stored in the cloud resources 302-306, so that validation of the cookies and other data may be fast and accurate.

The cloud resource services (302-306) may be used for configuration management, validation of various cookies received from different sources and different platforms, etc. The EWS module 130-a acts as a central access point for providing the necessary data for validating the access token provided in the request. The EWS module, as a result, interacts with the various cloud resource services to retrieve the necessary data and provides the same to the API/IWS module within the secure zone for validating the request before the payment card information can be encrypted and persisted in storage.

In one embodiment, after the API/IWS module 130-b of the vault host performs the verification of the first access token and the second access token (i.e., vault access token), the charge details are forwarded to the appropriate card or financial institutions so that the user's account may be charged for the transaction. The API/IWS may pass such information to the financial institutions using one or more payment processors 160. The payment processors 160 are a set of servers that are part of a secure network and any communication between the API/IWS and payment processors 160, and between the payment processors and the financial institutions follow the strict guidelines of the communication protocol established by the related industry.

Figure 5A:
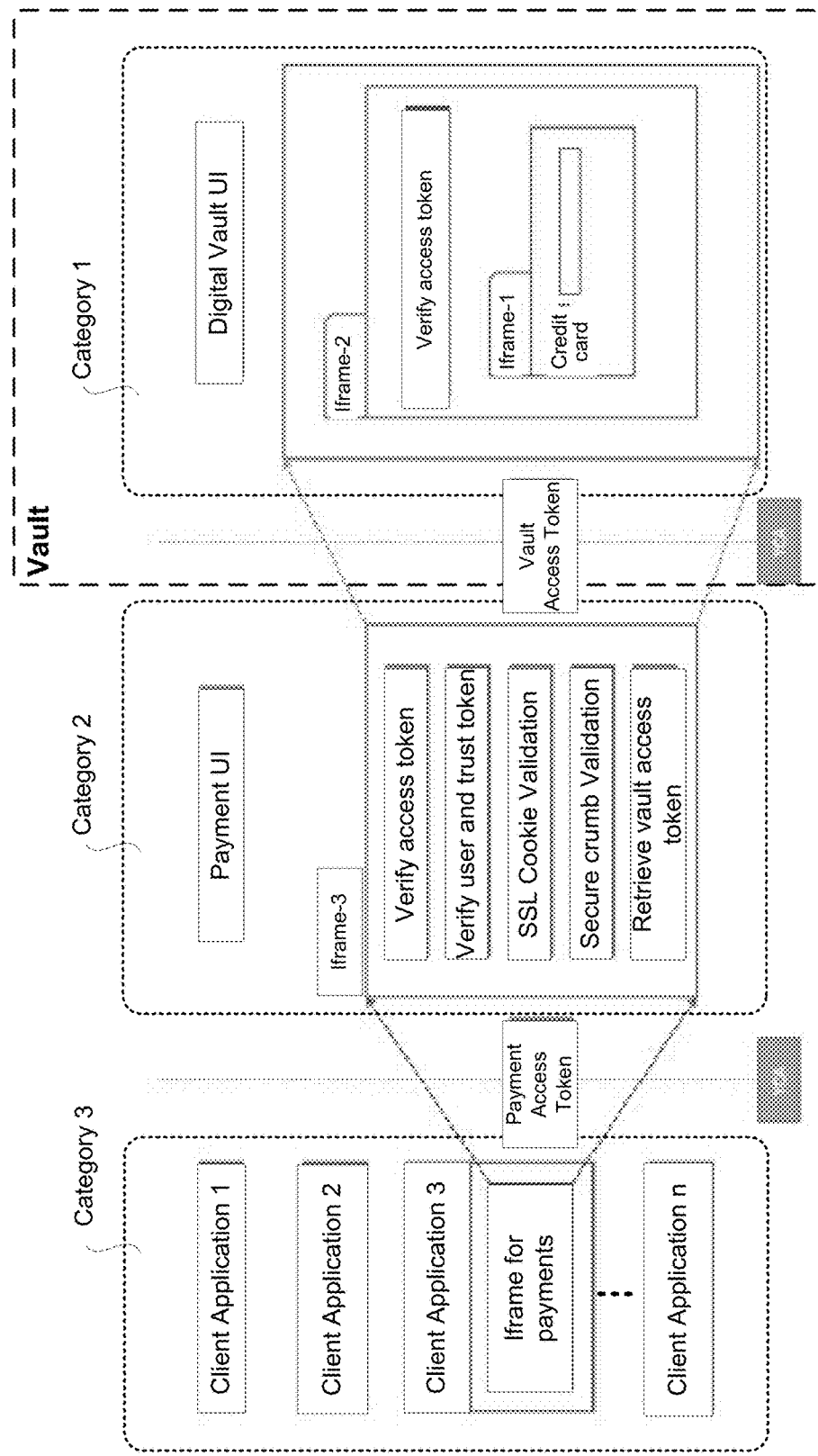
FIG. 5A illustrates an example security model used in validating access token generated in response to a user's payment request in accordance with an embodiment of the invention.

FIG. 5A illustrates an example list of security checks performed by Payment UI hosts and the vault hosts to validate a request received from a user of a client device, in one embodiment. In this example, the client device is configured to access a client application (e.g., client applications 1-n). The client applications are hosted by a website, e.g., which may use one or more servers. The website is considered a category 3 server. As noted above, category 3 servers can host applications, e.g., such as client applications. In FIG. 5A, client application 3 is being hosted by, for example, a website. The client application 3 may function to receive sensitive information. The sensitive information is generally data. Any type of data that needs security when communicated, can benefit from the embodiments described herein. For purposes of the present example, the sensitive information may be payment information, e.g., such as credit card information.

Still referring to FIG. 5A, the payment UI host is shown as a category 2 server. The payment UI host is processing the data provided using the iframe-3. In some embodiments, the payment UI host is referred to as an intermediate server. The payment UI host is configured to verify the data provided using the iframe-3 and pass a second access token to a vault host, which is a category 1 server (servers), upon successful verification of the data. The vault host executes iframe-2, which is invoked by iframe-3 of the payment UI host, and iframe-2 is configured to provide access to iframe-1, which is also executed by the vault host or by another host that is within the secure zone. As used herein, nested iframes, therefore, refer to the fact that iframe-1 is nested in iframe-2, and iframe-2 is nested in iframe-3.

Continuing with FIG. 5A, a request is generated when a user selects a payment option on a merchant's property page. A client application (for e.g., any one of client applications 1-n) accessed by a client device, engages a service that provides the nested iframes. The client application may be, for example, on any web site containing any type of content. One example website may be a property page. As used herein, a property page refers to a webpage that includes certain type of content, e.g., news, entertainment, stocks, etc. In one embodiment, the client application validates itself using the user-related cookies and trust cookies provided by the user. If the client application is unable to validate itself, the client application will retrieve a new set of user-related and/or trust cookies. With valid user cookies, the client application engages the nested iframe service. The service is used to retrieve an access token, which in one embodiment is a payment access token, to invoke a payment UI host associated with the payment access token, and pass the data provided in the request along with the payment access token using an iframe for validation.

The iframe that is used to invoke the payment UI host is the outer iframe (i.e., iframe-3) that is outside the secure zone and is provided on the merchant's property page, e.g., a web page. Some of the data that is passed to the payment UI host for verification includes a payment access token, various cookies that are related to the user, the session, the application, and the host. For example, the cookies may include user-access cookies (e.g., tokens) and trust cookies (e.g., tokens), secure cookie crumbs (Scrumb), crumbs, secure socket layer (SSL) cookies, etc. It should be noted that the aforementioned data is offered as an example and that fewer or additional data may be passed to the payment UI host along with the payment access token or simply just the payment access token.

The payment UI host receives the token and data passed by the outer iframe and validates the client application's request. In some embodiments, the payment UI host validates the request in a specific order. In some other embodiments, the order of validation performed by the payment UI host may vary. An example order of validation is illustrated in FIG. 5A. Of course, the sequence and type of validation illustrated in FIG. 5A is illustrative. As shown, the payment UI host is a category 2 host that is outside the secure zone. The payment UI host validates the data provided by the service engaged by the client application by first validating the payment access token. During the validation process, if the payment access token is found to be invalid, the payment UI host returns the request to the service engaged by the client application with an access error as response. After successful validation of the payment access token, the payment UI host validates the rest of the data provided with the payment access token by the outer iframe in the order described in FIG. 5A or in any other order. If any one of the data is invalid, the request is returned with corresponding error as response.

Once the client application request has been successfully validated, the payment UI host retrieves an access token for the secure zone (otherwise referred to as "second access token" or a "vault access token"). The payment UI host interacts with the vault host by invoking the middle iframe (iframe-2). The payment UI host may pass the vault access token, and some or all of the information passed by the outer iframe. The information passed by the payment UI host through the middle iframe may include one or more user-related, session-related, application-related, host-related and/or any other proprietary or non-proprietary information that may be useful for authenticating the request. For example, some of the information that may be used to invoke the vault host may include the same user cookies, Scrumb, crumb, SSL cookies that were passed by the outer iframe or may include a different set of information passed by the payment UI host. In one example, in addition to the vault access token, user cookies, Scrumb, crumb, SSL cookies, etc., the payment access token may also be passed to the vault host for verification. The above list of information used to invoke the vault host is offered as an example and should not be considered restrictive. Fewer or additional user-related, session-related, application-related, host-related data may be used to invoke the vault host so long as such information has been either provided by the outer iframe or the payment UI host.

In some embodiments, some level of segmentation may be provided by introducing one or more additional intermediate servers (e.g., category 2 server(s)) between the payment UI host and the vault host. It should be noted that the payment UI host is an intermediate server (category 2 server) that is invoked to perform the validation of the payment access token and to retrieve the vault access token. In these embodiments, the additional intermediate servers may receive the information from the payment UI host, perform additional level of validation before forwarding the information to the vault host through the middle iframe for a more thorough validation or additional validation. In accordance to these embodiments, the one or more of the additional intermediate servers may be configured to invoke the vault host by passing the vault access token and other data through the middle iframe or a signal may be generated by the additional intermediate servers, upon successful validation, to request the payment UI host to invoke the vault host through the middle iframe. This segmentation provides additional level of security to the vault host thereby preventing any direct access to the vault host from any server outside the secure zone.

Upon invoking the vault host, the vault host performs validation of the data passed through the middle iframe. For example, in response to the invoking of the middle iframe, the vault host may first validate the payment access token to ensure that an authorized payment UI host is accessing the vault host. During validation, if it is determined that an unauthorized payment UI host is trying to access the vault host, a vault access error is returned as response to the request. After validating the payment access token, the vault host proceeds to validate the vault access token. If the vault access token is found to be invalid, the vault host will return the request with a vault access error as response. Once the vault access token has been validated, other data provided by the payment UI host may be validated. When any one of the other data is found to be invalid, the request is returned to the payment UI host with corresponding error as response.

Once all the other data has been validated and the payment UI request has been deemed authentic and valid, the vault host provides access to the inner iframe which returns a page response that contains the payment user interface (UI) form within the inner iframe (e.g., iframe-1). The payment UI form may include one or more fields for collecting sensitive information. The response may, in some embodiments, also have an X-Frame header limited to the Payment UI domain. The information provided in the X-Frame allows the vault host to perform its own validation of the payment UI host and the payment UI host to perform its own validation of the vault host. This two way validation ensures that the vault host cannot be "iframed" (i.e., accessed through an iframe) by any other host other than the authorized payment UI host and the communication is between the vault host and the authorized payment UI host.

The payment UI form provided in the response is returned to the client for rendering on the clients' property page for collecting the payment card information. In some embodiments, the rendering of the payment UI form may include un-hiding the payment UI form at the property page and the response provided by the vault host may include a command to activate the rendering attributes to un-hide the payment UI form. It should be noted, as illustrated in FIG. 5A, that the iframe-2 and the iframe-1 are within the digital vault (i.e., the secure zone) and validation of the data are performed within the secure zone. Further, iframe-2 and iframe-3 are hidden from view at the property page (e.g., the web page of the merchant from where the request was initiated).

Figure 5B:
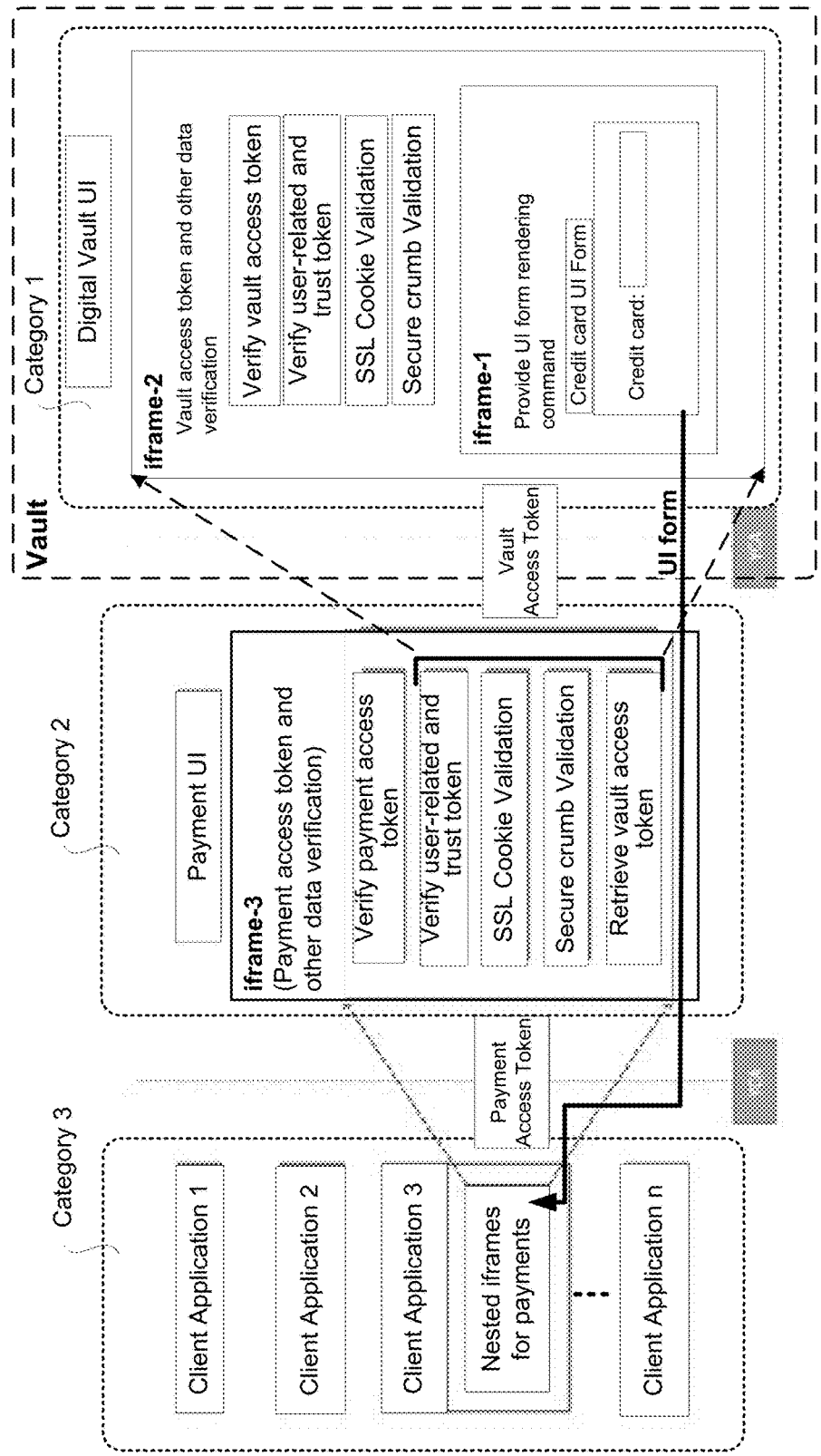
FIG. 5B illustrates the role played by each host system in validating access token and other information provided in a request and for providing a response to a user's payment request in accordance with an embodiment of the invention.

FIG. 5B illustrates the role played by each category host in the validation of the data provided in the request. To start with, a host that provides the web page (i.e., merchant billing page) that is used to receive payment card information validates itself and validates a request that was initiated for entering payment card information. The host providing the web page is a category 3 host. Upon successful validation of the request, the host invokes a payment UI host using an iframe-3 and passes the request and a payment access token identifying the payment UI host, for validation by the payment UI host. The payment UI host is a category 2 host. The payment UI host performs the validation of the payment access token and other data provided in the request and retrieves a vault access token. The payment UI host then invokes a vault host and passes the vault access token along with the request to the vault host through iframe-2.

The data provided through the iframe-2 is validated by the vault host (which is a category 1 host) and upon successful verification, access to the iframe-1 is provided with a request to provide the UI form for receiving payment card information. The vault host may pass the necessary information for rendering the UI form through the iframe-1. In one embodiment, the information passed through the iframe-1 includes a command to un-hide the UI form at the web page. Based on the command, the payment UI host returns the UI form to the web page (i.e., merchant's billing page) for rendering and for receiving the payment card information.

Figure 5C:
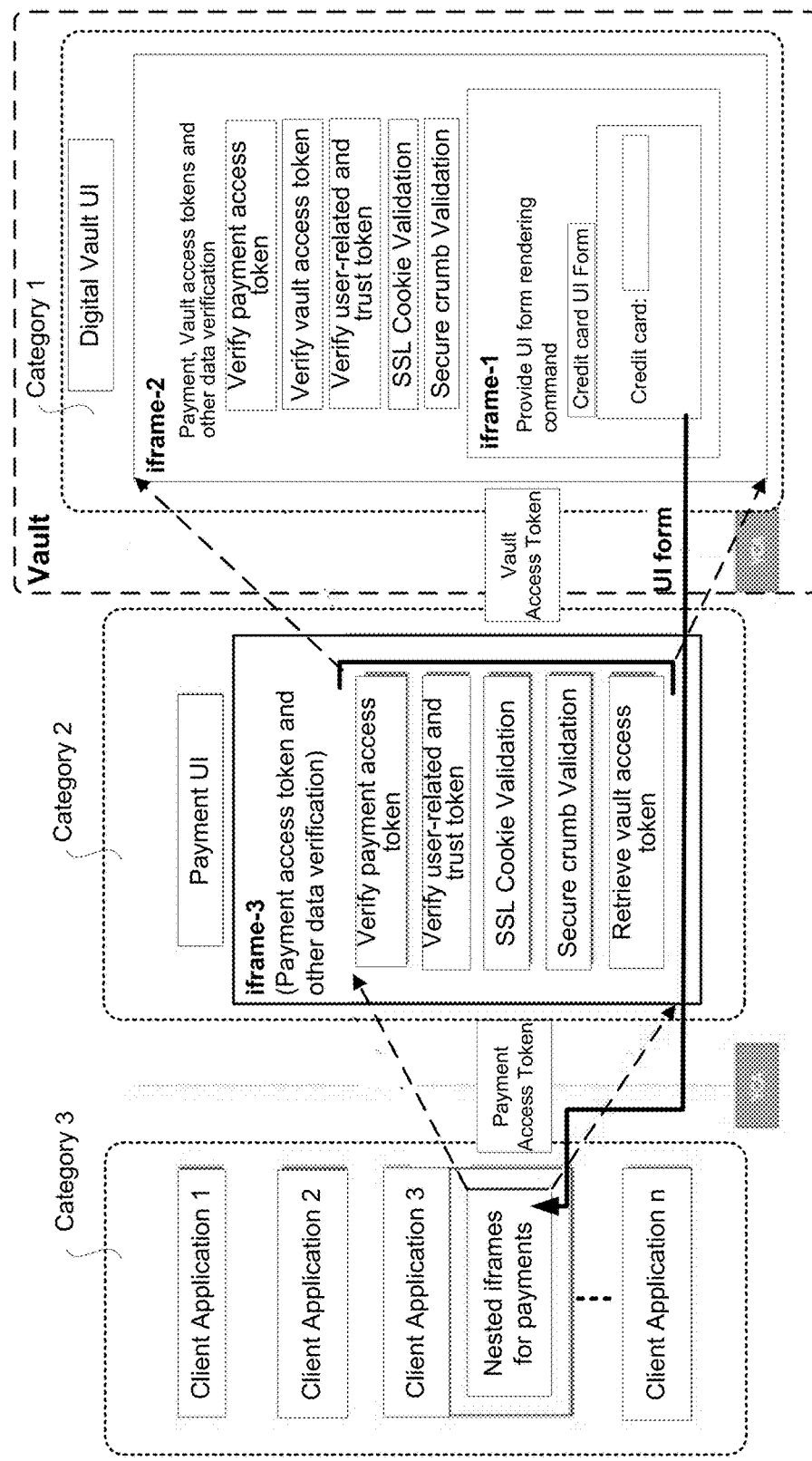
FIG. 5C illustrates an alternate embodiment of the invention in which payment access token, vault access token, and user-related trust token are verified within the digital vault.

FIG. 5C illustrates an embodiment wherein the payment UI host upon validating the payment access token and other data provided in the request, retrieves a vault access token and passes the retrieved vault access token, the payment access token and the other data provided in the request to a vault host. The vault host performs the validation of the data sent by the payment UI host. The sequence of verification may include verification of the payment access token first, as shown in FIG. 5C, (to ensure that an authorized payment UI host is interacting with the vault host), followed by verification of vault access token and then other data in the request. In an alternate sequence, the vault access token may be verified first, followed by the payment access token and then other data in the request. Irrespective of the validation sequence followed, upon successful validation of all the data, the vault host may provide access the iframe-1 and issue a command to un-hide the UI form, e.g., a payment UI form, at the merchant's web page. The vault host and the payment UI host may independently perform verification of data provided in the respective request in any number of ways and/or sequence before the payment UI form is made available at the merchant's web page for collecting payment card information. As stated above, more than one payment UI host may be used to perform the requisite validation of data provided in the request originating from the web page before information for rendering the payment UI form on the merchant's web page is provided.

Figure 6:
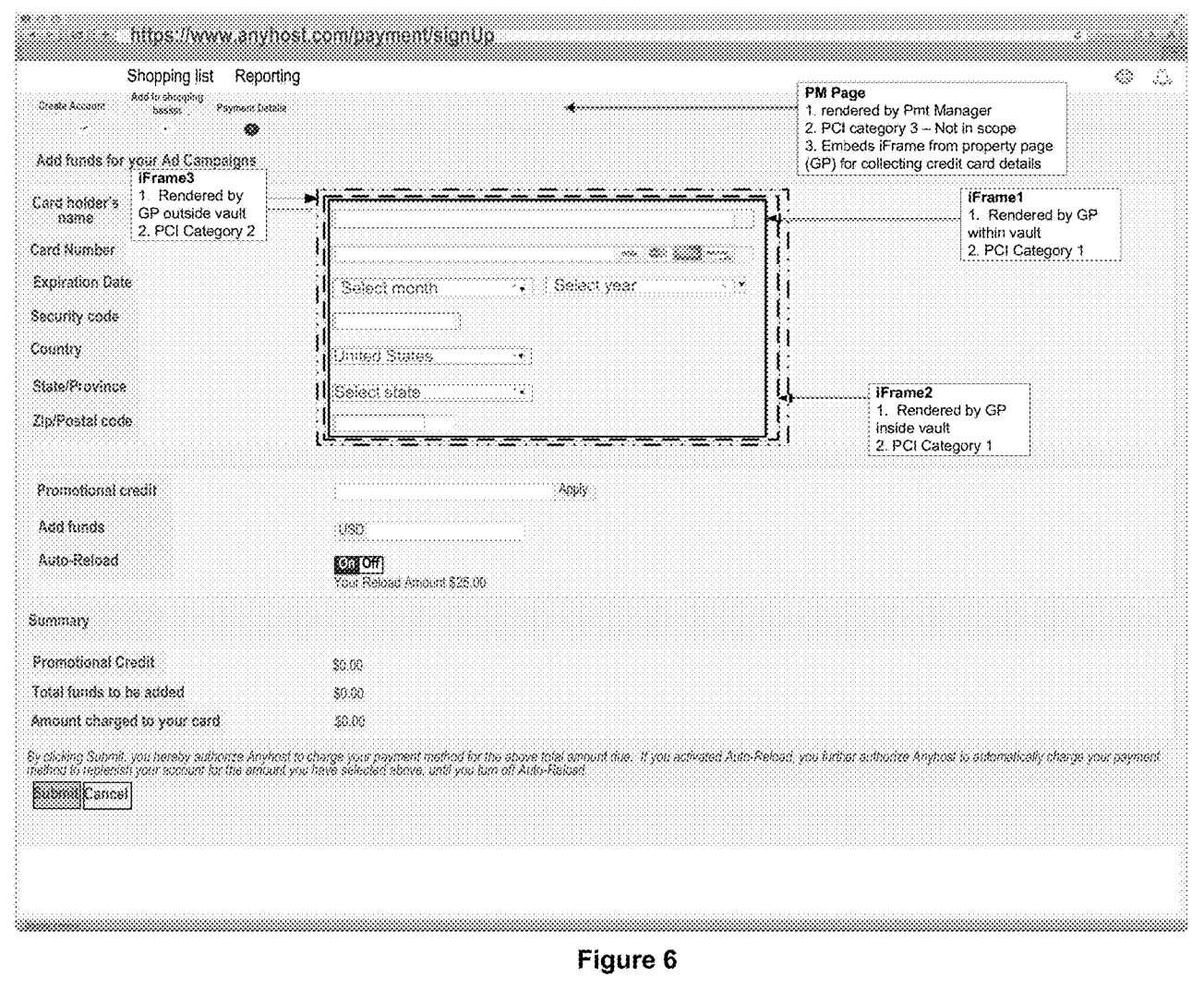

FIG. 6 illustrates an example merchant billing page that is used to invoke the nested iframe for entering a payment method, in accordance with embodiments of the invention in which the sensitive information is payment card information. The nested iframe of FIG. 6 allows data related to various fields in a form to be exchanged with the vault host through the user interface provided in the merchant's web page. The example merchant billing page is related to adding an advertisement campaign. As shown, the advertisement management page (i.e., the merchant's billing page) is rendered by a category 3 host that includes a nested iframe for collecting payment card information details. The iframe that is rendered includes an outer iframe (iframe-3) that can be invoked from the billing page (category 3 page) and is an empty shell, a middle iframe (iframe-2) inside the secure zone that can be invoked from the outer iframe and is also an empty shell, the middle iframe is invoked by a UI host that is outside the secure zone, and an inner iframe (iframe-1) that can be invoked only by iframe-2 and is hosted on a host inside the secure zone. Unlike the iframe-2, which is an empty shell, iframe-1 provides a user interface form that includes a plurality of fields to collect the payment card and other security-related information from a cardholder. The empty shells, in one embodiment, provide some level of abstraction so as to introduce indirection so that access from the outer iframe to the inner iframe is not direct but is forced through the intermediate servers invoking the middle iframe. In another embodiment, the empty shells introduce some level of segmentation so that access from outer iframe to the inner iframe is forced through the middle iframe. This sense of indirection or segmentation allows the system to secure the payment card information while allowing the users and merchants to engage in e-commerce transaction without having to deal with complexity of maintaining or complying with any stringent industry or institution requirements.

Figure 7:
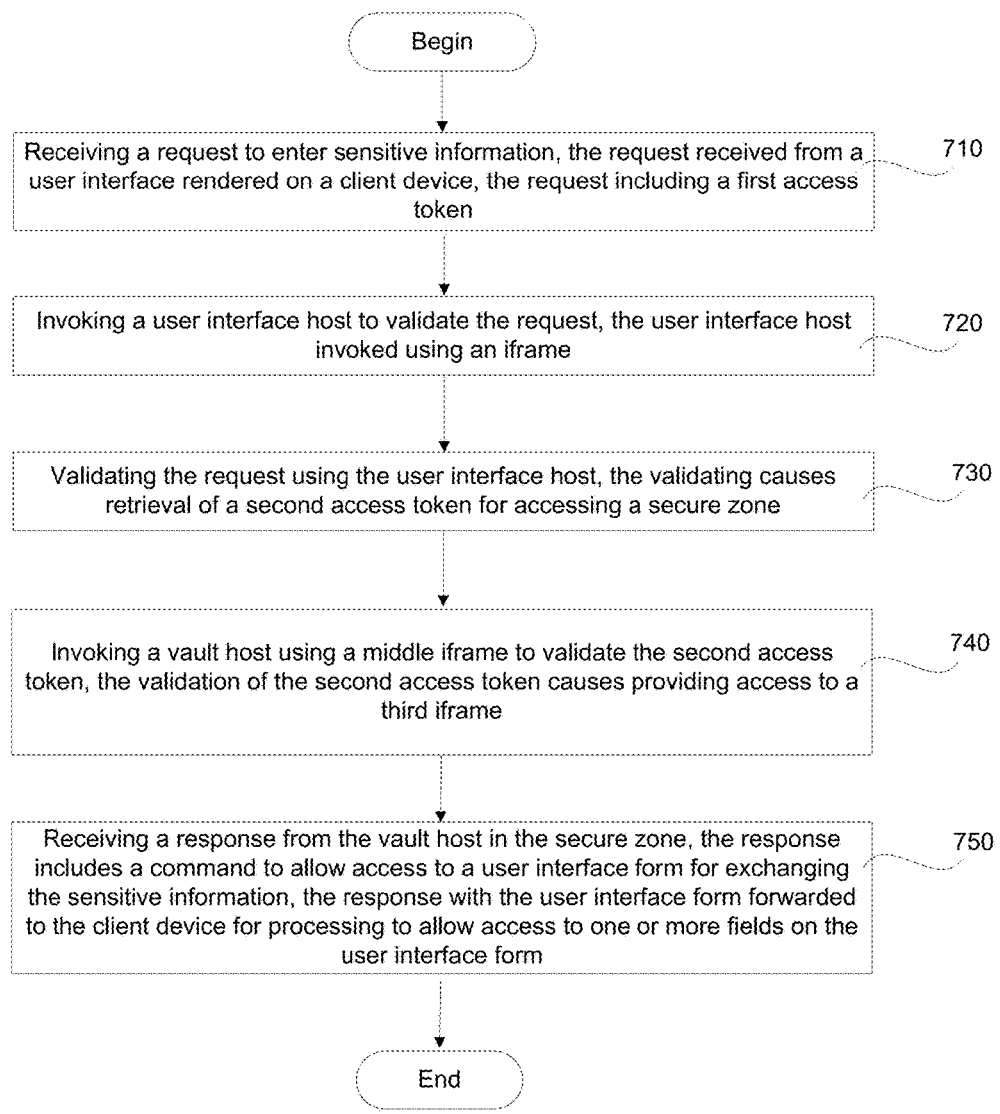
FIG. 7 illustrates a flow chart of process flow operations used for securely collecting payment card information using a nested iframe in accordance with an embodiment of the invention.

With the above detailed description of the various embodiments, a method is described with reference to FIG. 7. The method begins at operation 710 wherein a request for exchanging sensitive information is received from a user interface that is rendered on a client device. The user interface may be a merchant's web page that is used to perform a transaction. The request is validated at the user interface and a first access token associated with a user interface (UI) host, is retrieved. The UI host is invoked using an iframe, as illustrated in operation 720. The first access token and the other data provided in the request are validated by the UI host, as illustrated in operation 730. The validation may go through a defined sequence by first validating the first access token that identifies the UI host. Once the first access token validation is successful, other user-related, session-related, host-related data (e.g., cookies), etc., provided in the request are validated by the UI host. The validation of the request causes the UI host to retrieve a second access token for accessing a secure zone.

A vault host within the secure zone is invoked by the UI host using the middle iframe (i.e., iframe-2) by passing the second access token, as illustrated in operation 740. In response to the invoking, the vault host first validates the second access token to ensure that the token is from a valid UI host that is authorized to communicate with the vault host and that the request is a valid request. The vault host, upon successfully validating the request forwarded by the UI host, will provide access to an inner iframe (i.e., iframe-1). The iframe and the middle iframe are hidden from view in the user interface. The inner iframe will return a response to the UI host via the middle iframe (i.e., iframe-2) that includes information for rendering the UI form, within the inner iframe (i.e., iframe-1). The information provided in the inner iframe may include a command to un-hide the UI form provided in the iframe-1. The UI host receives the response that includes the un-hide command to allow access to the UI form on the user interface for exchanging the sensitive information, as illustrated in operation 750. The response is returned to the client device, where the command is processed, the UI form is rendered on the user interface and access to the UI form is enabled. The UI form is used to receive the sensitive information.

Figure 8:
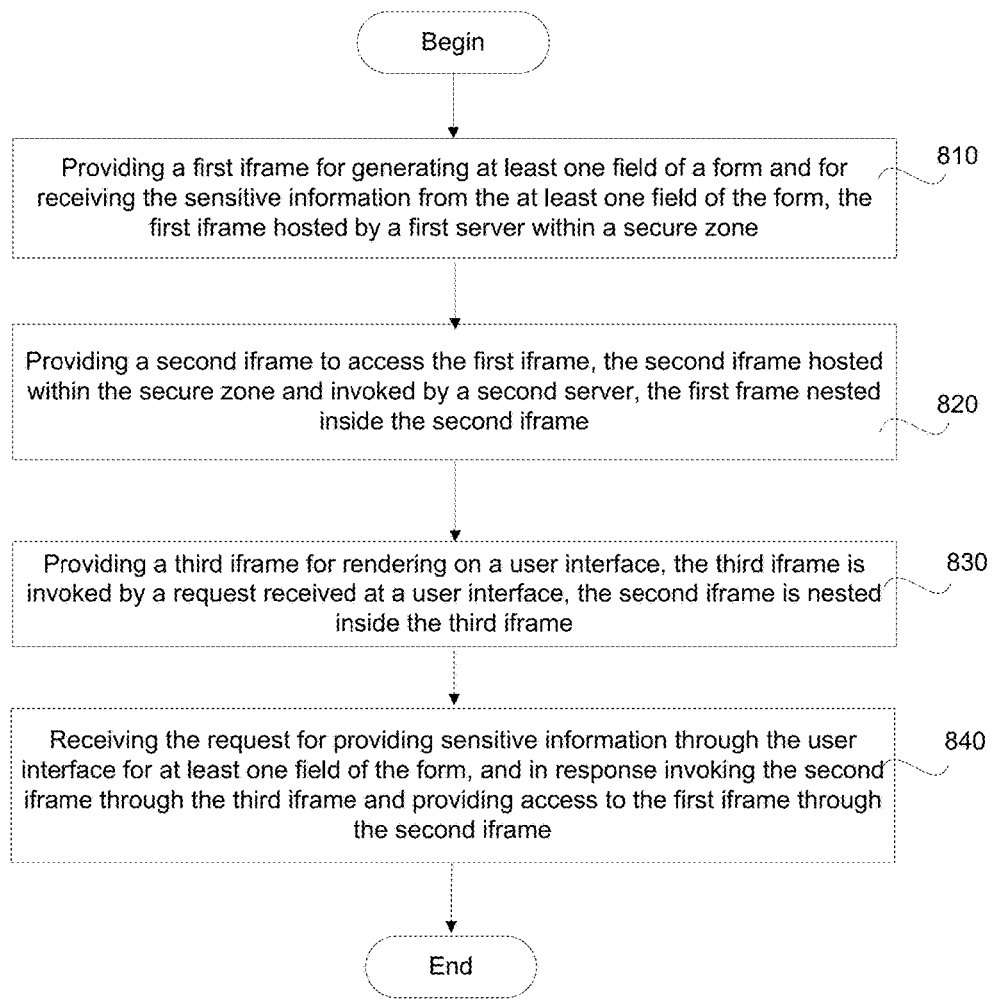
FIG. 8 illustrates flow chart of process operations used for securely collecting payment card information using a nested iframe in accordance with an alternate embodiment of the invention.

In another embodiment, a method for receiving sensitive information will now be discussed with reference to FIG. 8. A user interface, such as a web page, is configured for using the service. In some embodiments, the service may be accessed by hosting a nested inline frame (iframe) architecture on the web page. The method begins at operation 810 wherein a first iframe is provided for generating at least one field of a form and for receiving the sensitive information from at least the one field of the form. The first iframe is hosted by a first server that is within a secure zone. A second iframe is provided to invoke the first iframe, as illustrated in operation 820. The second iframe is hosted within the secure zone and is invoked by a second server. As mentioned earlier, depending on the embodiment, the second iframe may be hosted by servers within the secure zone at a security level that is between the first level of security defined for the first server and a second level of security that is different from the first level of security, hosted by servers within the same secure zone as the first server hosting the first iframe, or hosted by servers within the same logical zone as the second level of security.

The second iframe is configured to invoke the first iframe using an access token, e.g., a secure zone access token, retrieved by the second server. The first iframe is nested within the second iframe. A third iframe is provided for embedding on a user interface, such as the web page, rendered on a client device, as illustrated in operation 830. The third iframe is invoked by the third server that is outside the secure zone, in response to a request received at a user interface. The third iframe is used to invoke the second server using a sensitive information token. The second iframe is nested inside the third iframe. A request to exchange the sensitive information is received through the user interface, as illustrated in operation 840. The request includes the sensitive information token. In response to receiving the request for providing sensitive information, the second iframe is invoked through the third iframe and the first iframe is invoked through the second iframe.

The processing of the request allows a UI form to be returned for rendering on the user interface by the first iframe. In some embodiments, the processing of the request causes a command to be returned via the first iframe to adjust the rendering attributes of the at least one field within the UI form included in the first iframe so as to un-hide the at least one field in the UI form and render it on the user interface at the web page provided on the client device. The unhidden field(s) in the UI form is used to enter the sensitive information. The second and the third iframes of the nested iframe architecture are hidden from view at the user interface and the first iframe renders the UI form. Sensitive information provided on the UI form is processed by the first server and stored within a database that is maintained in the secure zone.

The nested iframe architecture allows collection of the sensitive information, such as payment card and other financial, private information, related to a user in a secure manner by the server within the secure zone while the third server outside the secure zone is providing a window for rendering the UI form. This manner of collecting and securing private and financial information using the nested iframe requires very minimal changes at the merchant's property pages (i.e., embedding the nested iframe on the property page) to allow invoking of the appropriate iframe hosts, allowing the merchants to continue to attend to their business of enticing and retaining users at their property pages.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
    receiving a request to enter sensitive information, the request received from a webpage rendered on a client device, the request includes a first access token;
    invoking a user interface host to validate the first access token provided in the request, the user interface host invoked using a first iframe;
    validating the first access token provided in the request using the user interface host, the validating of the first access token causes retrieval of a second access token by the user interface host for accessing a secure zone;
    invoking a vault host within the secure zone using the second access token, the vault host in the secure zone used to validate the second access token; and
    receiving a response from the vault host in the secure zone, in response to validating the second access token, the response including a command to allow access to one or more fields on the webpage for entering the sensitive information, the response forwarded to the client device for processing to allow access to the one or more fields on the webpage, wherein the response is provided to the first iframe through a second iframe and a third iframe that are hosted within the secure zone, the third iframe being nested within the second iframe, the third iframe being accessed by invoking the second iframe, wherein method operations are performed by one or more processors.

2. The method of claim 1, wherein the invoking of the vault host within the secure zone is performed by the user interface host.

3. The method of claim 1, wherein the second iframe and the third iframe are different from the first iframe, and wherein the second iframe is nested within the first iframe.

4. The method of claim 1, wherein the second iframe and the first iframe are hidden from view on the webpage.

5. The method of claim 1, wherein the third iframe is rendered as content by a browser on the webpage.

6. The method of claim 1, wherein the third iframe is rendered in a popup window.

7. The method of claim 1, wherein the user interface host is one or more of a virtual server or a non-virtual server hosted by a cloud service provider.

8. The method of claim 1, wherein the vault host within the secure zone includes one or more servers that are not virtual servers.

9. The method of claim 1, wherein the one or more fields are part of a user interface form rendered by a native mobile application.

10. The method of claim 1, wherein the one or more fields are part of a user interface form rendered by a browser on the webpage.

11. A non-transitory computer-readable medium having program instructions defined thereon for executing a service for receiving sensitive information, a user interface configured for using the service, the program instructions including:

program instructions for receiving a request for entering the sensitive information from the user interface hosted by a server outside a secure zone, the request being received by a server within the secure zone through a third, second, and first iframes, the second iframe being invoked upon successful validation of an access token received with the request, the first iframe being invoked upon successful validation of a secure zone access token received via the second iframe, wherein the third iframe is hosted by the server outside the secure zone and the first and the second iframes are hosted by the server within the secure zone, the first iframe nested within the second iframe and the second iframe nested within the third iframe;

program instructions for hiding the second and the third iframes from view in the user interface; and program instruction for forwarding a command using the first iframe to the third iframe through the second iframe to display at least one field of a form on the user interface for receiving sensitive information on the user interface.

12. The non-transitory computer-readable medium of claim 11, wherein the program instructions for receiving the request further includes, program instructions for validating the request; and program instructions for invoking the server inside the secure zone using the third iframe and passing the access token and other data provided in the request, upon successful validation of the request.

13. The non-transitory computer-readable medium of claim 11, wherein the server outside the secure zone is a virtual server hosted by a cloud service provider.

14. The non-transitory computer-readable medium of claim 11, wherein the sensitive information comprises payment card information.

15. The non-transitory computer-readable medium of claim 11, wherein program instructions for processing the request are configured to receive the request from a native mobile application or a web browser.

16. A non-transitory computer-readable medium having program instructions defined thereon for executing a service for receiving sensitive information, a user interface configured for using the service, the program instructions including:

program instructions for receiving a request for entering sensitive information, from the user interface hosted by a server outside a secure zone, the request being received by a server within the secure zone through a third, second, and first iframes, the second iframe being invoked upon successful validation of an access token received with the request, the first iframe being invoked upon successful validation of a secure zone access token received via the second iframe, wherein the first iframe is nested within the second iframe and the second iframe is nested within the third iframe;

program instructions for hiding the second and the third iframes from view in the user interface; and program instruction for forwarding a command using the first iframe to the third iframe through the second iframe to display at least one field of a form on the user interface for receiving sensitive information on the user interface.

17. The non-transitory computer-readable medium of claim 16, wherein the third iframe is hosted by the server outside the secure zone and the first and the second iframes are hosted by the server within the secure zone.

\* \* \* \* \*